Patented Nov. 8, 1927.

1,648,861

UNITED STATES PATENT OFFICE.

THOMAS A. O'BARR, OF WEBB CITY, MISSOURI, ASSIGNOR, BY MESNE ASSIGNMENTS, TO E. I. DU PONT DE NEMOURS & COMPANY, OF WILMINGTON, DELAWARE, A CORPORATION OF DELAWARE.

WATERPROOFING COMPOSITION AND METHOD OF PRODUCING THE SAME.

No Drawing.  Application filed March 8, 1924. Serial No. 697,705.

The invention is concerned with a waterproofing composition which, while applicable to many kinds of materials, is particularly applicable to ingredients for explosives.

One important object of the invention is to provide an inexpensive waterproofing composition which, when applied to the material, will spread over all surface irregularities in a thin protective film which is impervious to moisture but will neither harden nor de-sensitize the material to an injurious extent.

Another important object is to provide a method of producing the waterproofing composition, whereby to develop in the composition those properties which best adapt the same for association with any particular material.

Another object is to provide a method of applying the waterproofing composition to the material, whereby to insure proper association with the same.

Other objects and advantages not specifically referred to in the disclosure will be appreciated upon a full comprehension of the nature of the waterproofing composition as hereinafter described.

The waterproofing composition contains a vegetable drying oil, such as tung oil, linseed oil, or poppyseed oil; a gum or resin, such as colophony; and one or more mixtures of members of the paraffin series, such mixtures being exemplified by petrolatum and paraffin.

The relative proportions in which the above named constituents occur in the waterproofing composition are subject to variation, since the proportions influence the properties developed in the composition, and it may be desirable in specific instances of proposed application to either accentuate or minimize certain of such properties.

The following mixture of the constituents, which is of course but one exemplifying embodiment of the invention, will produce a batch of the waterproofing composition which is particularly applicable to ingredients for explosives and is in such application quite superior to other compositions heretofore employed for the same purpose:

| | Per cent. |
|---|---|
| Tung oil | about 2 |
| Colophony | " 5 |
| Petrolatum | " 13 |
| Paraffin | " 80 |

The method of producing the waterproofing composition from the above mentioned constituents is preferably performed by melting the colophony, heating the tung oil, adding the melted colophony to the heated tung oil, and heating the colophony-tung oil mixture until a test portion of the mixture will not affect the stability of ammonium nitrate when added to the same; then heating and mixing together the petrolatum and the paraffin; and then adding the colophony-tung oil mixture to the petrolatum-paraffin mixture and agitating the resulting mixture until a homogeneous composition is obtained. This method insures uniform production of the desired composition, and overcomes in a simple manner the difficulty which is usually experienced in attempting to render into homogeneous composition constituents which are in such unequal quantities and are of such dissimilar physical characteristics.

The method of applying the waterproofing composition to a material, for instance ammonium nitrate, is preferably performed by applying the composition in melted condition to the ammonium nitrate when the latter is at a temperature above the melting point of the composition. This method results in a uniformly spread coating of the composition over all surface irregularities of the material.

It is intended, of course, that where specific substances are recited in the following claims that such claims be construed to cover substances of the same general class which can be substituted for the substances named without invention. By the term "resin" as employed in the claims, for instance, I intend to designate not only those oxygenated bodies generally produced by the oxidation of terpenes and related hydrocarbons in plants and technically classified as "resins", but as well those exudations from plants known as gums and gum resins and substances of a similar nature.

I claim:

1. The method of applying to ammonium nitrate a waterproofing composition containing tung oil, colophony, petrolatum and paraffin, which comprises applying the composition in melted condition to the ammonium nitrate when the latter is at a temperature above the melting point of the composition.

2. An ingredient for explosives comprising ammonium nitrate, the particles of which are uniformly coated with a layer of waterproofing material consisting of a homogeneous mixture of tung-oil, a resin and members of the paraffin series.

3. An ingredient for explosives uniformly coated with a layer of waterproofing material comprising a homogeneous mixture of a vegetable drying oil, a resin and members of the paraffin series.

4. A method of waterproofing ammonium nitrate, which comprises melting resin and mixing it, while melted, with a heated vegetable drying oil until a test portion of the mixture will not affect the stability of a test portion of ammonium nitrate, mixing the drying oil-resin liquid with a heated mixture of hydro-carbons of the paraffin series, heating the ammonium nitrate to a temperature above the melting point of the composition and applying the composition while in melted form to the heated nitrate.

In testimony whereof I have hereunto signed my name.

THOMAS A. O'BARR.